April 9, 1940.  S. R. ATKINSON  2,196,516
ORTHODONTIC APPLIANCE AND METHOD OF PRODUCING THE SAME
Filed Nov. 24, 1937
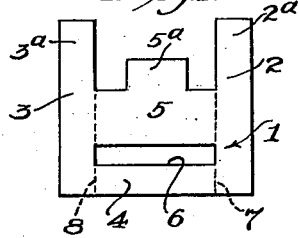
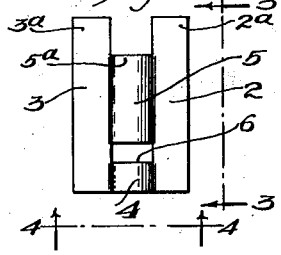
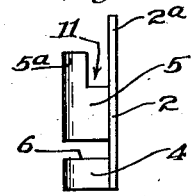
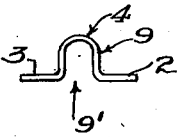
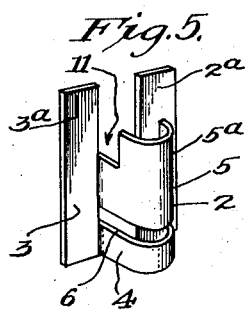
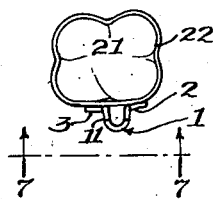
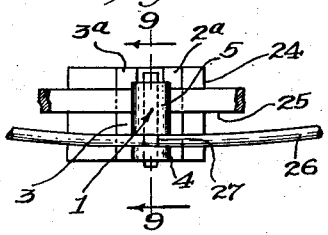
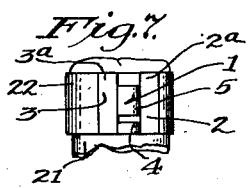
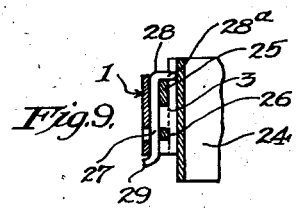
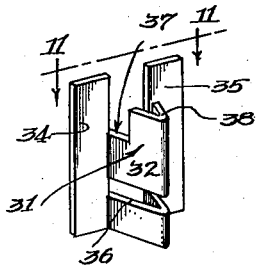
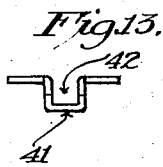
INVENTOR.
Spencer R. Atkinson,
BY
ATTORNEYS.

Patented Apr. 9, 1940

2,196,516

UNITED STATES PATENT OFFICE 2,196,516

ORTHODONTIC APPLIANCE AND METHOD OF PRODUCING THE SAME

Spencer R. Atkinson, Pasadena, Calif., assignor to Research Corporation, New York, N. Y., a corporation of New York Application November 24, 1937, Serial No. 176,316

3 Claims. (Cl. 32—14)

My invention relates generally to orthodontic appliances and more particularly to a bracket that may be secured to a tooth band to serve as a point of attachment or anchorage for the wires and springs and other orthodontic devices that are utilized in connection with the tooth bands, and to a method of producing such a bracket.

The principal object of the invention is to provide a highly advantageous form of bracket for attachment to a tooth band which may be located in the lingual, buccal, or labial portion of the mouth.

Another object of the invention is to provide a bracket which will hold incisal and gingival arch wires without allowing them to come in contact with the tooth band and at the same time distribute the stresses produced by such wires over a large portion of the tooth band.

Another object of the invention is to provide a universal bracket which may be bent into the required shape from a flat blank of thin metal.

A further object of the invention is to provide a bracket which may be bent to conform to the surface of any tooth band and which may be easily attached thereto by spot welding.

Further objects and advantages of the invention will either be specifically brought out in the following description or will be apparent therefrom.

The bracket of this invention comprises in general a blank of thin sheet metal which has portions bent to define a longitudinally extending channel having open ends and an open side. The bracket also includes a mounting tab on each side of the channel which extends laterally from the channel. The walls of the channel are also slotted transversely near one end thereof for the reception of a wire and they are notched at the other end thereof for the reception of a second wire. The bracket is preferably formed from a unitary blank of thin sheet metal, and the mounting tabs are preferably formed as lateral extensions of the side wall portions of the channel and also preferably extend longitudinally beyond the notched end of the channel.

An important feature of the invention resides in constructing the mounting tabs so that they extend beyond the notched end of the channel. The extensions of the mounting tabs in this manner make it easier to insert an incisal wire in the notch since the extensions serve as guides for the wire. They also serve as supports to the wire when the wire passes through the notch at an angle. These extensions also provide more surface which may be used for spot-welding the mounting tabs to the tooth band and at the same time they serve to stiffen the band at the upper edge thereof to prevent bending and the chance of tooth decay resulting therefrom.

The construction of the channel also provides the bracket with advantages in regard to fastening the respective wires to the bracket, as will be more fully brought out hereinafter.

I have illustrated my invention in the accompanying drawing, in which:

Fig. 1 is a plan view of a thin metal blank which may be formed into a bracket of my invention;

Fig. 2 is a front elevation of a bracket according to my invention formed from the blank shown in Fig. 1;

Fig. 3 is a side elevation thereof taken on line 3—3 in Fig. 2;

Fig. 4 is an inverted plan view thereof taken on line 4—4 in Fig. 2;

Fig. 5 is a perspective view thereof;

Fig. 6 is a plan view of a tooth with a band attached thereto which is provided with a bracket according to this invention;

Fig. 7 is an elevation thereof taken on line 7—7 in Fig. 6;

Fig. 8 is an enlarged view of a tooth band provided with a universal bracket, corresponding in general to Fig. 7, illustrating a mode of attachment of gingival and incisal arch wires to the bracket;

Fig. 9 is a sectional view thereof taken on line 9—9 in Fig. 8;

Fig. 10 is a perspective view of a modified form of bracket;

Fig. 11 is a plan view thereof taken on line 11—11 in Fig. 10;

Fig. 12 is a perspective view of another form of bracket; and

Fig. 13 is a plan view thereof taken on line 13—13 in Fig. 12.

Referring to Fig. 1, a blank of thin sheet metal from which a bracket of this invention may be formed is indicated generally at 1, and is shown as comprising two laterally separated, longitudinally extending and substantially rectangular areas 2 and 3, joined to and connected by a pair of central areas 4 and 5 which are separated longitudinally from one another by a rectangular slot 6. The junctures of the areas 2 and 3 with the adjoining areas 4 and 5 are indicated by the dotted lines 7 and 8 respectively. Referring now to Figs. 1 through 5, the blank shown in Fig. 1 is bent along the dotted lines 7 and 8 and the portions 4 and 5 are bowed outwardly to define the front and side walls of a longitudinally extending channel 9 having open ends and an open rear side 9'. The areas 2 and 3 define mounting tabs 2 and 3 which extend laterally from the sides of the channel and extend longitudinally for a distance which is greater than the length of the channel. A transverse slot 6 is formed adjacent the lower end of the channel by the slot 6 in Fig. 1, and a notch is formed at 11 at the other end of the channel through the cooperation of an upwardly projecting portion 5a of the area 5 and the upper portions of the mounting tabs 2 and 3.

The sheet metal from which the bracket is fabricated is relatively thin, from a practical standpoint, and tough, and bendable, so that it may be bent into the desired form. At the same time the metal is relatively thick and rigid as compared to the metal used in the tooth band, which is ordinarily formed of very thin soft metal. Thus the tooth band may be fabricated from soft stainless steel of 0.006 inch thickness while the bracket of this invention may be fabricated from hard stainless steel of 0.012 inch thickness which becomes harder during the bending operations. It will be seen then that the relatively rigid bracket provides a rigid support for the arch wires, and provides for a better control of the stresses imparted by an arch wire. It is believed apparent that other metals may be used for the bands and brackets such as gold-platinum alloys, and brackets of this invention are not limited to any particular metal.

The notch 11 should be made sufficiently wide to accommodate an incisal wire of either round or rectangular cross-section and should be sufficiently deep so that the portion 5a will extend above the wire when the wire is resting on the bottom of the notch. The mounting tabs 2 and 3 are preferably extended above the end of the portion 5a as at 2a and 3a for a substantial distance, for example, a distance about equal to or greater than the depth of the notch. This serves to increase the contact area of the bracket with the tooth band and help to strengthen the tooth band, particularly at the upper edges thereof. It also facilitates the insertion of an incisal wire in the notch 11, since there are no projections to catch the wire as it is moved downwardly into the notch. The operator may simply place the wire in contact with the upwardly projecting portions 2a and 3a, and then slide the wire downwardly along these portions until it comes to rest at the bottom of the notch 11. It may also be seen that the notch 11 may be used to receive an incisal wire which extends at an angle different than 90° from the longitudinal axis of the channel 9 and that the load imparted by such an angularly disposed wire will be carried by either of the mounting tab extensions 2a or 3a and will be held from contact with the tooth band by these tab portions.

Referring to Figs. 6 and 7, a tooth indicated at 21 is encircled with a tooth band 22 to which is attached a bracket 1. The mounting tabs 2 and 3 of the bracket are shown bent to conform with the surface of the band 22 and may be secured thereto by soldering or brazing, but preferably by spot welding. Since the tooth band is usually constructed of thin material and the bracket 1 is also preferably constructed of thin material, these two members may be easily attached by electric spot welding before the band is attached to the tooth.

The tabs 2 and 3 may be made sufficiently long so that they may be used with tooth bands of various widths and may be cut off with a pair of pliers, for example, to adapt them for use with narrower bands.

In Figs. 8 and 9 a tooth band 24 is shown provided with a bracket 1. An incisal wire, indicated at 25, and a gingival wire, indicated at 26, are shown secured to said bracket. The notch 11 is adapted to receive the incisal arch wire 25, preferably so that the wire is in firm engagement with the sides of the notch, and the transverse slot 6 is adapted to receive the gingival wire 26. The longitudinally extending channel 9 is shown to be of sufficient depth so that a pin 27 may be inserted in a longitudinal direction between the outside of the wires 25 and 26 and the channel wall portions 4 and 5. The pin holds the wire 26 in position and the upper portion of the pin 27 is preferably bent inwardly over the incisal wire 25 as at 28 to hold said wire 25 in the notch 11. The lower portion 29 of the pin 27 may be bent so as to engage beneath the lower end of the channel wall and prevent the pin from sliding upwardly out of the channel.

It will be seen that the channel 9 is open at the side toward the tooth band, as shown at 9'. Although the band 24 serves to close this side of the channel when the bracket is secured to the band, this construction provides a recessed space between the inner edges of the tab portions 2 and 3. The bent-over portion 28 at the upper end of the pin 27 is preferably made of sufficient length so that the inner end 28a extends into this recessed space, whereby the edges of the tabs 2 and 3 provide shoulders for engaging the end 28a of the bent-over portion 28 so as to prevent turning of the pin 27 and thus provide a more rigid assembly. In this regard it will be noted that the inner sides of the wires 25 and 26 are spaced from the tooth band by the thickness of the mounting tabs 2 and 3 so that a ligature may be passed through the space shown as occupied by the pin 27 and also between the inner sides of the wires 25 and 26 and the tooth band. It will be appreciated, therefore, that a U-shaped clip may be substituted for the pin 27 and the open ends of the U may be bent over in the manner of the end 29 of the pin 27.

It will be seen from inspection of Figs. 8 and 9 that both of the wires 25 and 26 are out of contact with the tooth band 24 and that the stresses produced by these wires are transmitted to the tooth band 24 through the mounting tabs 2 and 3 of the bracket 1. Thus the stresses transmitted to the band 24 will be divided into two parts, one part through the mounting tab 2 and the other part through the mounting tab 3, and each part of the stress will be distributed over an area equal in size to either one of the mounting tabs 2 or 3. Since the mounting tabs 2 and 3 are sufficiently thin so that they may be easily bent to conform to the shape of the tooth band to which they are applied, these tabs may be firmly attached thereto and a firm bearing may be had over the entire surface of the mounting tabs. This tends to equalize the stresses over the area of the mounting tabs and to distribute these stresses evenly over the tooth band so that there will be no highly stressed points on the band which are liable to cause undue pain and suffering on the part of the patient.

Although the constructions shown herein utilize much less material and thinner metal than previous constructions, there is little or no sacrifice of strength due to the shape of the sections which bear the load. The universal bracket of this invention exhibits sufficient strength so that it may be used for supplying torque to a tooth to rotate it about its axis, for mesio-distal uprightings or for labio-lingual uprightings. It will also be appreciated that this bracket may be equally adapted to the extrusion or instrusion of teeth.

In Figs. 10 and 11 I have illustrated a form of bracket at 31 which is provided with substantially plane side wall portions 32 and 33 which form two of the side walls of a substantially triangular channel 34 having open ends and an open side. The side wall portions 32 and 33 extend laterally at 34 and 35 to form mounting tabs. The side walls 32 and 33 are also provided with a transversely extending slot indicated at 36 and located near one end of the channel 34, for the reception of an orthodontic device such as a gingival wire. In this instance the front wall portion of the device is also made up of parts of the side wall portion so that the slot 36 may still be considered as extending transversely to the channel 34 and as passing through the front and side wall portions of said channel. A wire-receiving notch is indicated at 37 at the opposite end of said channel and passes through the side wall portions 32 and 33, for receiving an incisal wire. It will be noted that the upper end 38 of the channel 34 is positioned below the upper ends of the mounting tabs 34 and 35.

In Figs. 12 and 13 a similar form of bracket is indicated generally at 41. This bracket may be formed in exactly the same manner as the previously described bracket except that the channel portion indicated generally at 42 is rectangular in cross-section.

I claim:

1. An orthodontic appliance, comprising a bracket formed from a blank of thin sheet metal and having portions bent to define a longitudinally extending channel having open ends and an open side, said bracket also including a mounting tab on each side of said channel extending laterally from said channel, said tabs extending longitudinally for at least the length of said channel, the walls of said channel being slotted transversely near one end thereof for the reception of a wire and notched at the other end thereof for the reception of a second wire.

2. An orthodontic appliance, comprising a bracket formed from thin sheet metal and having portions bent to define front and side wall portions of a longitudinally extending channel having open ends and an open rear side, the front and side wall portions of said channel being slotted transversely near one end thereof for the reception of a wire and said side wall portions being notched at the other end of said channel for the reception of a second wire, said bracket also including a mounting tab on each side of said channel formed as a lateral extension of the side wall portions of said channel, said mounting tabs extending beyond said other end of said channel.

3. The method of producing an orthodontic band bracket which comprises: forming a blank of thin sheet metal to provide two laterally separated, longitudinally extending and substantially rectangular areas which are joined to and connected by a pair of longitudinally spaced central areas, one of said central areas being spaced from one end of said blank and provided with a longitudinally projecting portion which is spaced laterally from said longitudinally extending areas; and bending said blank along the junctures of said longitudinally extending areas with said central areas and bowing said central areas outwardly from the plane of said blank to form an open ended longitudinally extending channel having an open side, said longitudinally extending areas forming mounting tabs extending laterally from the walls of said channel and longitudinally for at least the length of said channel, the space between said central areas defining a transverse slot near one end of said channel for the reception of a wire, and said longitudinally projecting portion of said one central area cooperating with the ends of said mounting tabs to form a notch at the other end of said channel for the reception of a second wire.

SPENCER R. ATKINSON.